US012560302B2

(12) United States Patent
Chang

(10) Patent No.: US 12,560,302 B2
(45) Date of Patent: Feb. 24, 2026

(54) BACKLIGHT MODULE

(71) Applicant: DARWIN PRECISIONS CORPORATION, Hsinchu County (TW)

(72) Inventor: Yu-Cheng Chang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/654,026

(22) Filed: May 3, 2024

(65) Prior Publication Data

US 2025/0075880 A1 Mar. 6, 2025

(30) Foreign Application Priority Data

Aug. 30, 2023 (TW) .................................. 112132830

(51) Int. Cl.
| *F21V 7/00* | (2006.01) |
| *F21Y 105/16* | (2016.01) |
| *F21Y 113/00* | (2016.01) |
| *G02F 1/13357* | (2006.01) |

(52) U.S. Cl.
CPC ...... *F21V 7/0083* (2013.01); *G02F 1/133605* (2013.01); *F21Y 2105/16* (2016.08); *F21Y 2113/00* (2013.01); *G02F 1/133603* (2013.01)

(58) Field of Classification Search
CPC ..................... G02F 1/133603; G02F 1/133605
See application file for complete search history.

(56) References Cited

U.S. PATENT DOCUMENTS

| 9,465,156 | B2 | 10/2016 | Guo et al. | |
| 2011/0242742 | A1* | 10/2011 | Kim ......................... | H04N 5/64 |
| | | | | 361/679.01 |
| 2015/0036317 | A1* | 2/2015 | Yamamoto ........ | G02F 1/133609 |
| | | | | 362/84 |
| 2018/0224086 | A1* | 8/2018 | Nishimura ................ | F21S 2/00 |

FOREIGN PATENT DOCUMENTS

| CN | 207049680 | U | * | 2/2018 | ................ | F21S 4/28 |
| CN | 109557721 | A | * | 4/2019 | ....... | G02F 1/133603 |
| CN | 109686240 | A | | 4/2019 | | |
| CN | 113777826 | A | * | 12/2021 | | |
| TW | 201001019 | A | | 1/2010 | | |
| TW | 201347635 | A | | 11/2013 | | |
| TW | 201537782 | A | | 10/2015 | | |

* cited by examiner

*Primary Examiner* — Mariceli Santiago

(57) ABSTRACT

A backlight module, including a reflective plate and a plurality of light-emitting units. The reflective plate is provided with a reflective side. The light-emitting units are provided on the reflective side. The reflective plate includes a substrate and a reflective layer. The reflective layer covers the substrate. The reflective side is divided by the reflective layer into a first region and a second region surrounding the first region, and the reflectivity of the second region is greater than that of the first region.

9 Claims, 4 Drawing Sheets

BACKLIGHT MODULE

FIELD OF THE INVENTION

The present invention relates to a light source module, and in particular to a backlight module applied to a display.

BACKGROUND OF THE INVENTION

Displays are important products for human society nowadays. Current displays may be roughly categorized into self-luminous displays and non-self-luminous displays, where the non-self-luminous displays usually need to provide surface light sources for display panels through backlight modules.

The known backlight modules may be categorized into direct-type backlight modules and edge-type backlight modules according to a light entering mode, where the direct-type backlight modules are prone to a problem of central regions being significantly brighter than peripheries, resulting in poor overall brightness uniformity and thus affecting a display effect.

SUMMARY OF THE INVENTION

The present invention provides a backlight module, which can produce a surface light source with uniform brightness.

In order to achieve the above advantage, an embodiment of the present invention provides a backlight module, including a reflective plate and a plurality of light-emitting units. The reflective plate is provided with a reflective side. The plurality of light-emitting units is provided on the reflective side. The reflective plate includes a substrate and a reflective layer. The reflective layer covers the substrate and faces the reflective side. The reflective side is divided by the reflective layer into a first region and a second region surrounding the first region, and the reflectivity of the second region is greater than that of the first region.

In an embodiment, the reflective layer is provided with two regions with different reflectivity to form the first region and the second region.

In an embodiment, the second region is located at a peripheral part of the substrate, and the first region is located in a central part of the substrate.

In an embodiment, the reflective layer further includes a third region surrounding the second region, and the reflectivity of the third region is greater than that of the second region.

In an embodiment, the third region is located at a corner of the reflective plate, the second region is located at an edge of the substrate, and the first region is located in a central region of the reflective plate.

In an embodiment, the reflective layer is provided with a top surface facing away from the reflective side, the light-emitting units are provided with a light-exiting surface facing away from the substrate, and the top surface is between the substrate and the light-exiting surfaces.

In an embodiment, the reflective layer includes a reflective coating layer, and a thickness of the reflective coating layer in the first region is less than that of the reflective coating layer in the second region.

In an embodiment, the thickness of the above reflective coating layer decreases progressively from the second region to the first region.

In an embodiment, the reflective layer includes a first reflective sheet and a second reflective sheet, reflectivity of the second reflective sheet is greater than that of the first reflective sheet, the second reflective sheet forms the second region, and the first reflective sheet forms the first region.

In an embodiment, the reflective layer includes a combined sheet, the combined sheet is connected to the substrate and provided with a plurality of openings, the light-emitting units are provided in the openings respectively, and a side of the combined sheet facing away from the substrate is provided with a reflective coating layer.

By means of the above illustration, according to the present invention, the reflective layer is provided on the reflective plate so as to divide the reflective side into the first region and the second region, and the reflectivity of the second region is greater than that of the first region. Therefore, in the surface light source provided by the backlight module according to the present invention, the brightness corresponding to the second region is increased, such that in the surface light source, the brightness corresponding to the first region is substantially the same as the brightness corresponding to the second region. Thus, the backlight module according to the present invention can provide the surface light source with uniform brightness.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1A:
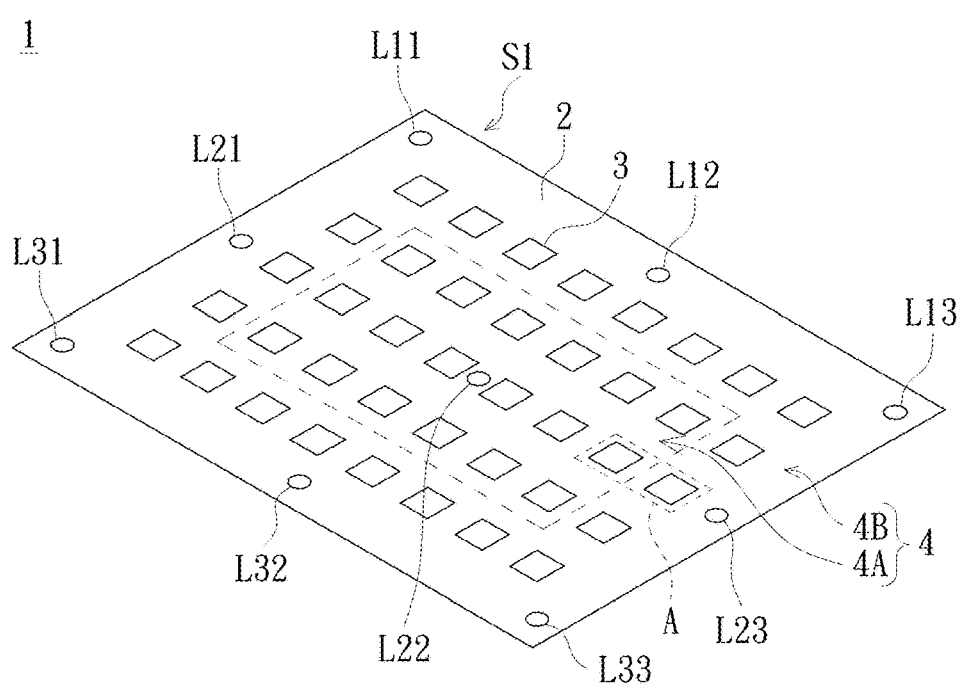
FIG. 1A is a schematic diagram of a backlight module according to an embodiment of the present invention.

Terms used in the description of the embodiments of the present invention, for example, orientation or position relation such as "above" and "below" are described according to the orientation or position relation shown in the drawings. The above terms are used for facilitating description of the present invention rather than limiting the present invention, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 1B:
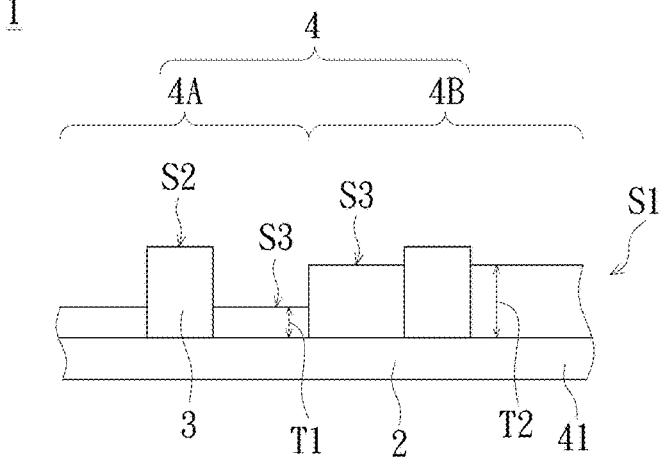
FIG. 1B is a schematic diagram of a side face of part A in FIG. 1A.

FIG. 1A is a schematic diagram of a backlight module 1 according to an embodiment of the present invention. FIG. 1B is a schematic diagram of a side face of part A in FIG. 1A. As shown in FIG. 1A and FIG. 1B, the backlight module 1 in an embodiment of the present invention includes a reflective plate 2 and a plurality of light-emitting units 3. The reflective plate 2 is provided with a reflective side S1. The light-emitting units 3 are provided on the reflective side S1. The reflective plate 2 includes a substrate 41 and a reflective layer 4. The reflective side S1 is divided by the reflective layer 4 into a first region 4A and a second region 4B surrounding the first region 4A, and the reflectivity of the second region 4B is greater than that of the first region 4A.

The reflective layer 4 in the embodiment, for example, covers the whole substrate 41 and faces the surface of one side of the reflective side S1.

In the embodiment, the substrate 41 of the reflective plate 2 is, for example, a printed circuit board (PCB), with a shape of, for example, a rectangle. The light-emitting units 3 are, for example, light-emitting diodes (LEDs), with a shape of, for example, a cube, but the above shapes are not limited thereto. The reflective layer 4 is, for example, a layered body formed by coating the substrate 41 with white or silver coating and covering the reflective side S1 of the whole substrate 41, but the above construction or color is not limited thereto. Additionally, the reflective layer 4 covering the reflective side S1 of the whole substrate 41 refers to a part of the reflective layer 4 covering the reflective side S1 of the substrate 41, but not shielding the light-emitting units 3. In other words, in the embodiment, the reflective layer 4 is not between the contact surfaces of the light-emitting units 3 and the substrate 41. In other embodiments, however, the reflective layer 4 may also be between the substrate 41 and the light-emitting units 3 (not shown in figures) due to differences in manufacturing methods (described in more detail below).

In the embodiment, every two adjacent light-emitting units 3 are, for example, provided at an equal distance, but are not limited thereto. In terms of distribution, the first region 4A is located in a central part of the reflective side S1 of the reflective plate 2, and the second region 4B is, for example, located at a peripheral part of the reflective side S1 of the reflective plate 2 and presented in a shape of a hollow square corresponding to the shape of the reflective plate 2, but the providing location and shape are not limited thereto (described in more detail below). In the embodiment, a boundary of the first region 4A and the second region 4B is between every two corresponding adjacent light-emitting units 3 (see FIG. 1A or FIG. 1B), but in other embodiments such as FIG. 2C and the like described below, the boundary may be aligned on one side of each of the light-emitting units 3, which may be provided according to a demand. The reflectivity of the first region 4A is, for example, 85%, and the reflectivity of the second region 4B is, for example, 93%, which is not limited thereto. An actual numerical value may be adjusted according to a distance between the light-emitting units 3 or other demands.

As shown in FIG. 1B, in the embodiment, the reflective layer 4 is provided with a top surface S3 facing away from the substrate 41, each of the light-emitting units 3 is provided with a light-exiting surface S2 facing away from the substrate 41, and in the direction of the substrate 41 towards the reflective side S1, the top surface S3 is between the substrate 41 and the light-exiting surfaces S2, so as to reflect illumination light exiting towards the substrate 41.

In the embodiment, the reflective layer 4 is, for example, a reflective coating layer including toner and resin, the toner being adapted to reflect light produced by the light-emitting units 3, and the resin being light transmittable resin adapted to disperse the toner and form a film, but is not limited thereto. As shown in FIG. 1B, the reflectivity of the reflective layer 4 may be affected by the thickness of the reflective coating layer because the material of the reflective coating layer includes the light transmittable resin in the embodiment. Specifically, the thicker the reflective layer 4 (the reflective coating layer) is, the more the toner laid on the substrate 41 is, and therefore the better the reflectivity there is. Therefore, as shown in FIG. 1B, in the embodiment, a thickness T1 of the reflective layer 4 in the first region 4A is less than a thickness T2 of the reflective layer 4 in the second region 4B, such that the reflectivity of the reflective layer 4 in the second region 4B may be greater than that of the reflective layer 4 in the first region 4A. However, the design of how the reflective layer 4 produces different reflectivity in different regions is not limited to the embodiment and may refer to the illustration of the following paragraphs. Additionally, in FIG. 1B, a thickness difference between the thickness T1 of the reflective layer 4 in the first region 4A and the thickness T2 of the reflective layer 4 in the second region 4B is only intended to indicate a difference in the thickness of the reflective layer 4, and the difference between the thickness T1 and the thickness T2 is not drawn to actual scale.

With respect to a specific method for manufacturing the backlight module 1 in the embodiment, in an embodiment, for example, the plurality of light-emitting units 3 are first provided on the reflective plate 2 and covered with a protective material (not shown in figures), then the substrate 41 is coated with the material of the reflective layer 4 in a printed or sprayed manner, and then the protective material is removed to complete the backlight module 1. In another embodiment of the present invention, for example, the reflective layer 4 may be first manufactured on the substrate 41 of the reflective plate 2 to form the first region 4A and the second region 4B so as to complete the reflective plate 2 of the backlight module 1, and then the light-emitting units 3 are provided on the reflective layer 4 or the substrate 41 (depending on whether there is a gap in the reflective layer 4) to complete the backlight module 1. However, the detailed method for manufacturing the backlight module 1 is not limited to the above example. As can be seen from the difference between the above manufacturing methods, the backlight module 1 will vary with the manufacturing method such that the reflective layer 4 on the substrate 41 may not be located between the contact surfaces of the light-emitting units 3 and the reflective plate 2 as shown in FIG. 1A, but may also be located between the light-emitting units 3 and the reflective plate 2 in other embodiments.

Table 1 below shows experimental data of measured luminous fluxes at different locations of the backlight module 1 in the embodiment of FIG. 1A. Table 2 shows experimental data of measured luminous fluxes at different locations of the backlight module 1 in the prior art. For nine points measured in Table 1, reference may be made to nine points in FIG. 1A, which are at Location L11 to Location L33. A distance from Location L11 to a long edge of the reflective plate 2 is, for example, one-tenth of the width of the reflective plate 2, and a distance from Location L11 to a short edge of the reflective plate 2 is, for example, one-tenth of a length of the reflective plate 2. A distance from Location L12 to the long edge of the reflective plate 2 is, for example, one-half of the width of the reflective plate 2 (center), and a distance from Location L12 to the short edge of the reflective plate 2 is, for example, one-tenth of the length of the reflective plate 2. Location L13 is symmetrical to Location L11 by taking a short axis passing through the center of the reflective plate 2 as an axis. Locations L31, L32, and L33 are symmetrical to Locations L11, L12, and L13 by taking a long axis passing through the center of the reflective plate 2 as an axis. L21 is located between L11 and L31 along the short axis of the reflective plate 2, which is the same for L22 and L23. Locations L11' to L33' of nine points measured in Table 2 correspond to the foregoing L11 to L33 respectively.

TABLE 1

| Location L11 | 300 | Location L21 | 313 | Location L31 | 287 |
|---|---|---|---|---|---|

5

TABLE 1-continued

| Location L12 | 346 | Location L22 | 367 | Location L32 | 322 |
| Location L13 | 294 | Location L23 | 322 | Location L33 | 284 |

TABLE 2

| Location L11' | 305 | Location L21' | 326 | Location L31' | 300 |
| Location L12' | 356 | Location L22' | 392 | Location L32' | 332 |
| Location L13' | 289 | Location L23' | 318 | Location L33' | 286 |

As can be seen from Table 1, Table 2, and a formula for calculating the uniformity of the backlight module: the uniformity=the brightness at the darkest location/the brightness at the brightest location×100%, the uniformity of the backlight module 1 according to the embodiment of FIG. 1A is about 77%, and the uniformity of the backlight module 1' in the prior art in Table 2 is about 73%. It can be seen that the brightness of the backlight module 1 according to the embodiment shown in FIG. 1A of the present invention does have preferred uniformity.

As can be seen from the above illustration, the backlight module 1 according to the embodiment in FIG. 1A is constructed in such a way that through the reflective layer 4, the reflectivity of the central first region 4A is less than that of the second region 4B surrounding the first region 4A, which can increase illumination light produced by the light-emitting units 3 in the second region 4B and produce a surface light source with uniform brightness.

FIGS. 2A to 2H are schematic diagrams of backlight modules according to different embodiments of the present invention. The substrate 41 and the light-emitting units 3 may be illustrated with reference to the foregoing embodiment in FIG. 1A, and thus will not be described in detail herein. Moreover, for ease of illustration, the light-emitting units 3 are omitted from FIG. 2A, FIG. 2B and FIG. 2D, and the reflective layer in each embodiment, except for the embodiment shown in FIG. 2D, covers the reflective side S1 of the whole substrate 41.

Figure 2A:
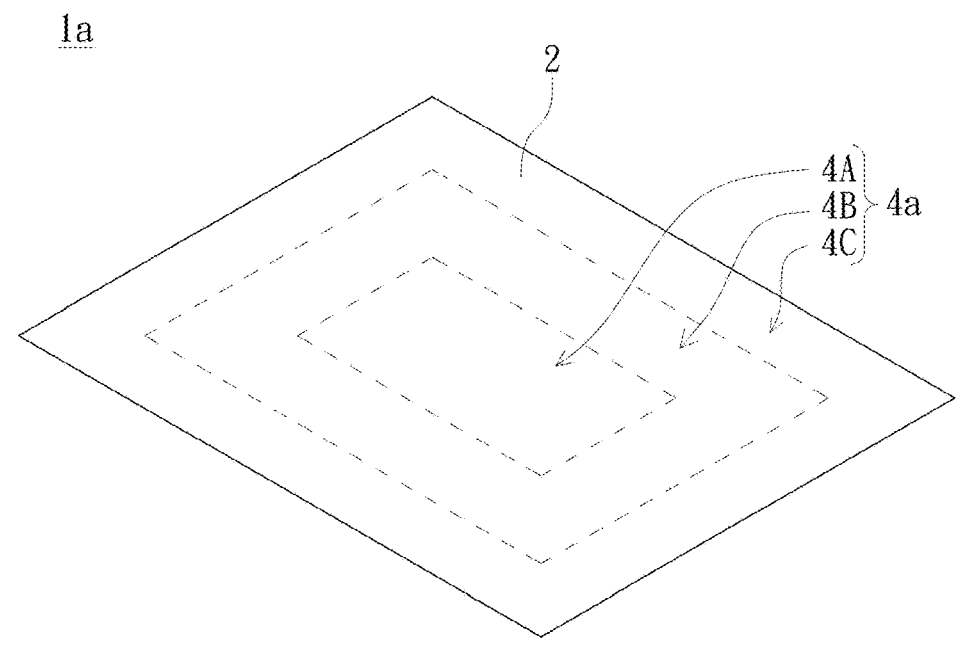
FIGS. 2A to 2H are schematic diagrams of backlight modules according to different embodiments of the present invention.

Referring to FIG. 2A, as can be seen from the foregoing paragraphs, in an embodiment shown in FIG. 2A, a reflective layer 4a of a backlight module 1a, for example, further includes a third region 4C surrounding the second region 4B. The reflectivity of the third region 4C is greater than that of the second region 4B. In terms of location, the third region 4C is, for example, located at the periphery of the reflective plate 2, the first region 4A is located in the center of the reflective plate 2, and the second region 4B is located between the third region 4C and the first region 4A. The manner in which the reflectivity of the reflective layer 4 in the third region 4C is greater than that of the reflective layer 4 in the second region 4B and the first region 4A may be illustrated with reference to the foregoing embodiment in FIG. 1A or other embodiments described below.

Figure 2B:
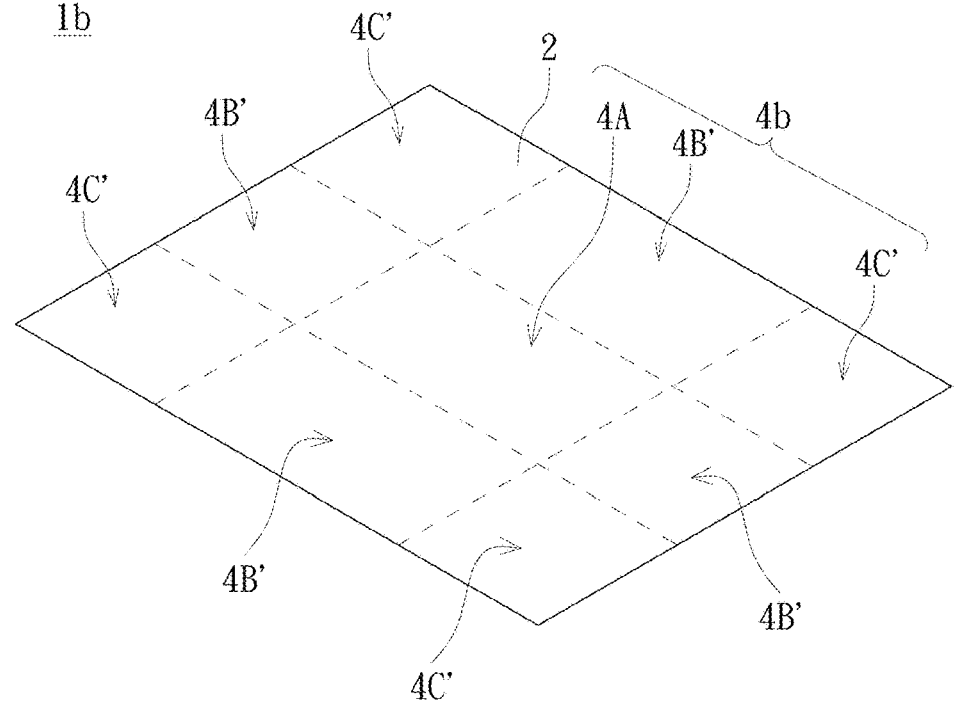

Referring to FIG. 2B and the foregoing Table 1, it can be observed from the foregoing Table 1 that in the embodiment in FIG. 1A, the brightness of Location L11, Location L13, Location L31 and Location L33 close to corners of the reflective plate 2 is less than that of Location L12, Location L21, Location L23 and Location L32 close to side edges of the reflective plate 2, and thus referring to FIG. 2B, in an embodiment of the present invention, a reflective layer 4b of a backlight module 1b further includes a third region surrounding the second region as well, and the reflectivity of the third region is greater than that of the second region. However in the embodiment, the third region is divided into a plurality of sub-regions 4C', each of which is located at a corresponding corner of the substrate 41, and the second region is divided into a plurality of sub-regions 4B', each of which is located at a corresponding edge of the substrate 41 and between the two corresponding sub-regions 4C'. The first region 4A is located in a central region of the substrate 41 and thus jointly surrounded by the sub-regions 4B' of the second region and the sub-regions 4C' of the third region.

As can be seen from the foregoing embodiments in FIG. 2A and FIG. 2B, in the embodiment of the present invention, the number of regions or locations of the reflective layer 4 may be increased depending on the intensity of actual light exiting from different regions on the reflective plate 2. Therefore, in an embodiment not shown in the figures of the present invention, the reflective layer 4 may further include a fourth region, or even a fifth region, a sixth region, or the like having reflectivity different from that of the first region 4A, the second region 4B, and the third region 4C, which may be provided according to demand. Also, the above examples are all illustrated by the embodiment where the reflective plate 2 is rectangular, and in an embodiment where the shape of the reflective plate 2 is different, the detailed design of the reflective layer 4 may vary with the shape of the reflective plate 2.

Figure 2C:
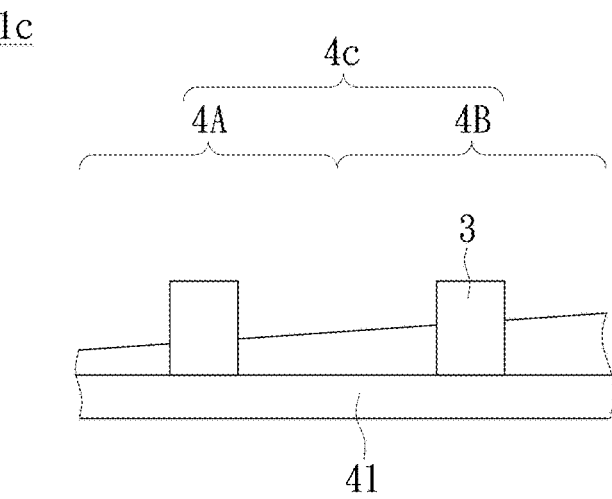

Referring to FIG. 2C, it can be understood from the illustration of the foregoing several embodiments that if the reflective layer 4 is divided into a plurality of different regions from the periphery to the center, and the reflectivity of the different regions decreases progressively from the periphery to the center, the reflective layer may be regarded as being divided into a very large number of regions with different reflectivity that varies gradually with locations (certainly including the first region 4A and the second region 4B as well). Specifically, referring to FIG. 2C, in an embodiment of the present invention, a reflective layer 4c of a backlight module 1c is, for example, presented in an inclined pattern of a decreasing thickness from the second region 4B to the first region 4A. A specific manufacturing method may be, for example, manufacturing a reflective coating layer with an inclined surface as the reflective layer 4c by coating the foregoing reflective coating through a spray gun, or by precisely controlling the thicknesses of the reflective coating layer at different locations during printing, which is not limited thereto.

Figure 2D:
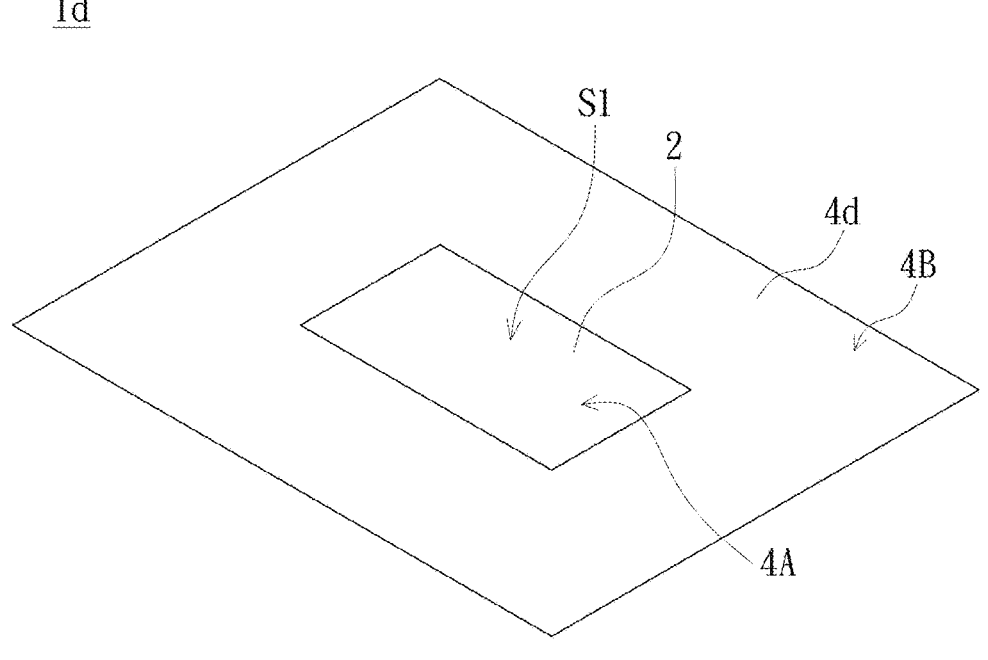

Related embodiments of how the first region 4A and the second region 4B may be made to have different reflectivity will be given below, but the means are not limited to these embodiments. Referring to FIG. 2D, in an embodiment, for example, only a periphery of a surface of a side of the substrate 41 facing the reflective side S1 is coated with a reflective layer 4d of a backlight panel 1d, while a central part of the surface of the side of the substrate 41 facing the reflective side S1 is not coated with the reflective layer 4d. In other words, a part of the reflective side S1 of the reflective plate 2 provided with the reflective layer 4d serves as a second region 2B, and a part of the reflective side S1 not provided with the reflective layer 4d serves as a first region 2A.

Figure 2E:
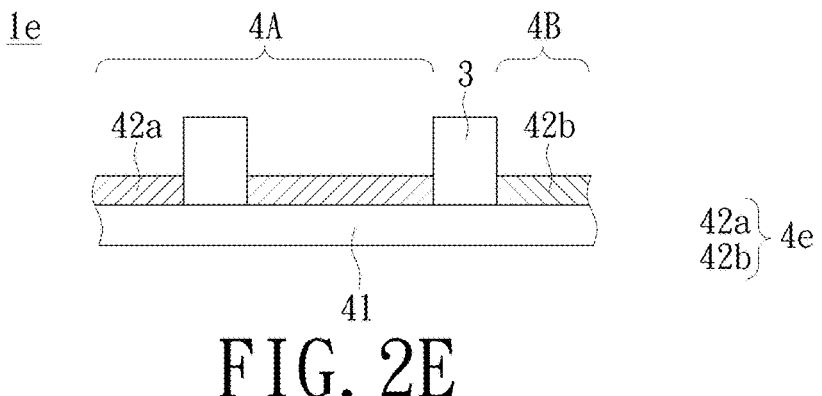

As shown in FIG. 2E, in an embodiment, a reflective layer 4e of a backlight module 1e includes, for example, a plurality of reflective patches, such as a first reflective sheet 42a and a second reflective sheet 42b, and reflectivity of the second reflective sheet 42b is greater than that of the first reflective sheet 42*a*, so that the foregoing reflective layer 4*e* may be formed by a construction in which the second reflective sheet 42*b* forms the second region 4B and the first reflective sheet 42*a* forms the first region 4A.

Figure 2F:
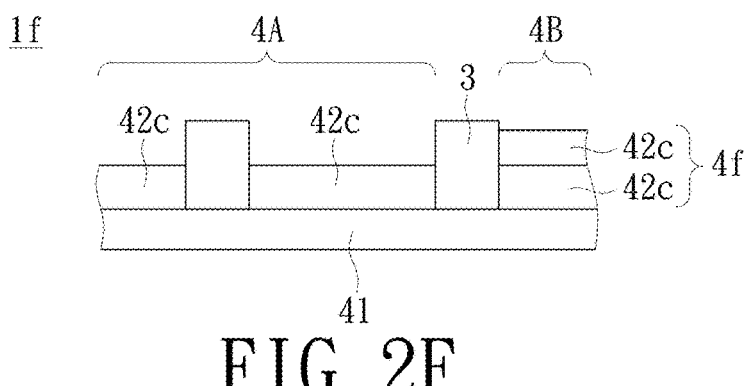

It should be understood that in other embodiments of the present invention, the foregoing reflective layer 4 may also be formed by using reflective coating of different colorants, or may be manufactured by using the reflective coating in the first region 4A, using the reflective patches in the second region 4B, or the like. Referring to FIG. 2F, in an embodiment, if a reflective patch 42*c* adopted by a reflective layer 4*f* of a backlight module 1*f* may be light transmittable, different reflectivity may also be produced on the reflective layer 4*f* by increasing the number of the reflective patch 42*c*.

Figure 2G:
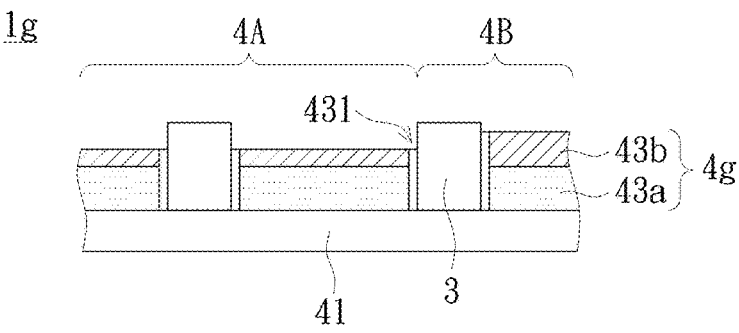

Referring to FIG. 2G, in an embodiment, a reflective layer 4*g* of a backlight module 1*g* includes a combined sheet 43*a* and a reflective coating layer 43*b*, but is not limited thereto. For example, the combined sheet 43*a* is a transparent patch with a plurality of openings 431, and a side of the combined sheet 43*a* facing away from the substrate 41 is coated with the reflective coating layer 43*b*. During assembly, the combined sheet 43*a* is connected to the substrate 41, and the locations of the light-emitting units 3 correspond to locations of the openings 431 respectively, by means of which, during manufacturing, the reflective layer 4*g* may be independently manufactured before being pasted on the surface of the substrate 41 to complete the backlight module 1*g*.

Figure 2H:
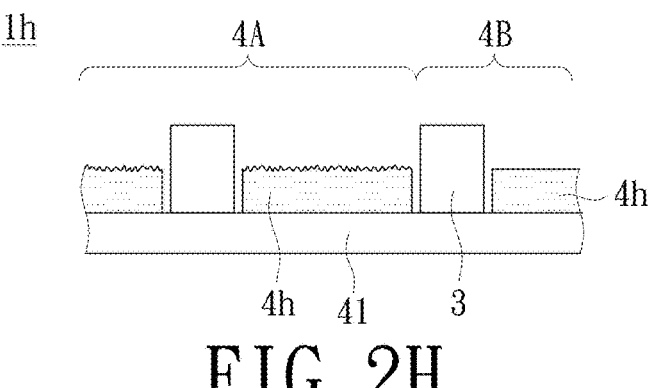

Referring to FIG. 2H, in an embodiment of the present invention, a reflective layer 4*h* may further be a membrane uniformly formed by a reflective material or a layer body with a roughly uniform thickness which is made by subsequent processing. In order to produce different reflectivity in different regions of a surface of the membrane, the roughness of surfaces of the different regions of the membrane may be changed by, for example, grinding or polishing, so that the different reflectivity is produced in the different regions. Specifically, the reflective layer 4*h* of the backlight module 1*h* in the embodiment of FIG. 2H is constructed in such a way that a surface of the first region 4A is rougher and a surface of the second region 4B is smoother, but is not limited thereto. Additionally, a processing method of changing a surface smoothness condition may be selected according to the type of an actual membrane, or a reflective patch with a different surface condition is directly selected.

It can be understood from the above embodiments that in other embodiments not shown in the figures, it in turn may also be realized on the surface of the membrane forming the reflective layer 4, a layer body capable of reducing reflectivity is provided on the reflective coating layer or the reflective patches in the first region 4A, so that the reflectivity of the second region 4B is greater than that of the first region 4A. The foregoing layer body is, for example, a transparent dark coating or a light transmittable dark sheet body, but is not limited thereto.

By means of the above illustration, according to the present invention, the reflective layer is provided on the reflective plate so as to divide the reflective side into the first region and the second region, and the reflectivity of the second region is greater than that of the first region. Therefore, in the surface light source provided by the backlight module according to the present invention, the brightness corresponding to the second region is increased, such that in the surface light source, the brightness corresponding to the first region is substantially the same as the brightness corresponding to the second region. Thus, the backlight module according to the present invention can provide the surface light source with uniform brightness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a reflective plate, having a reflective side; and
   a plurality of light-emitting units, arranged on the reflective side;
   wherein the reflective plate comprises a substrate and a reflective layer, the reflective layer covers the substrate, the reflective side is divided by the reflective layer into a first region and a second region surrounding the first region, and a reflectivity of the second region is greater than a reflectivity of the first region;
   wherein the reflective layer comprises a combined sheet, the combined sheet is connected to the substrate and has a plurality of openings, the light-emitting units are arranged in the openings respectively, and a side of the combined sheet facing away from the substrate is provided with a reflective coating layer;
   wherein the combined sheet comprises a transparent patch.

2. The backlight module according to claim 1, wherein the reflective layer has two regions with different reflectivity to form the first region and the second region.

3. The backlight module according to claim 2, wherein the second region is located at a peripheral part of the substrate, and the first region is located in a central part of the substrate.

4. The backlight module according to claim 1, wherein the reflective layer further comprises a third region surrounding the second region, and a reflectivity of the third region is greater than the reflectivity of the second region.

5. The backlight module according to claim 4, wherein the third region is located at a corner of the substrate, the second region is located at an edge of the substrate, and the first region is located in a central region of the substrate.

6. The backlight module according to claim 1, wherein the reflective layer has a top surface facing away from the substrate, the light-emitting units have a light-exiting surface facing away from the substrate, and the top surface is between the substrate and the light-exiting surface.

7. The backlight module according to claim 1, wherein the reflective layer comprises a reflective coating layer, and a thickness of the reflective coating layer in the first region is less than a thickness of the reflective coating layer in the second region.

8. The backlight module according to claim 7, wherein the thickness of the reflective coating layer decreases from the second region to the first region.

9. The backlight module according to claim 1, wherein the reflective layer comprises a first reflective sheet and a second reflective sheet, a reflectivity of the second reflective sheet is greater than a reflectivity of the first reflective sheet, the second reflective sheet forms the second region, and the first reflective sheet forms the first region.

* * * * *